July 31, 1962 — G. B. DE FILIPPI — 3,046,941
ANIMAL STANCHION APPLIANCE
Filed April 29, 1960 — 2 Sheets-Sheet 1
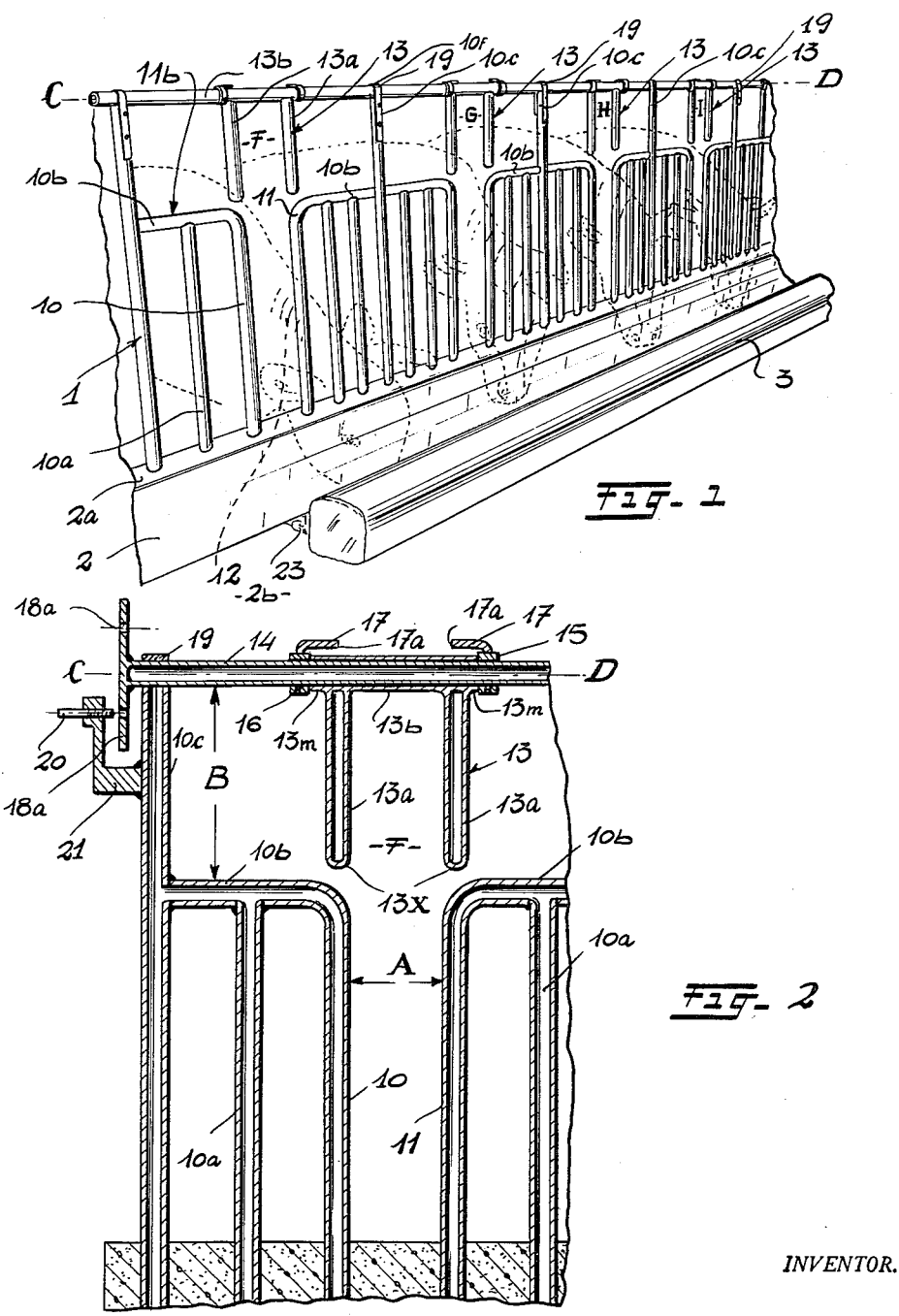
INVENTOR.
BY Giovanni Battista De Filippi

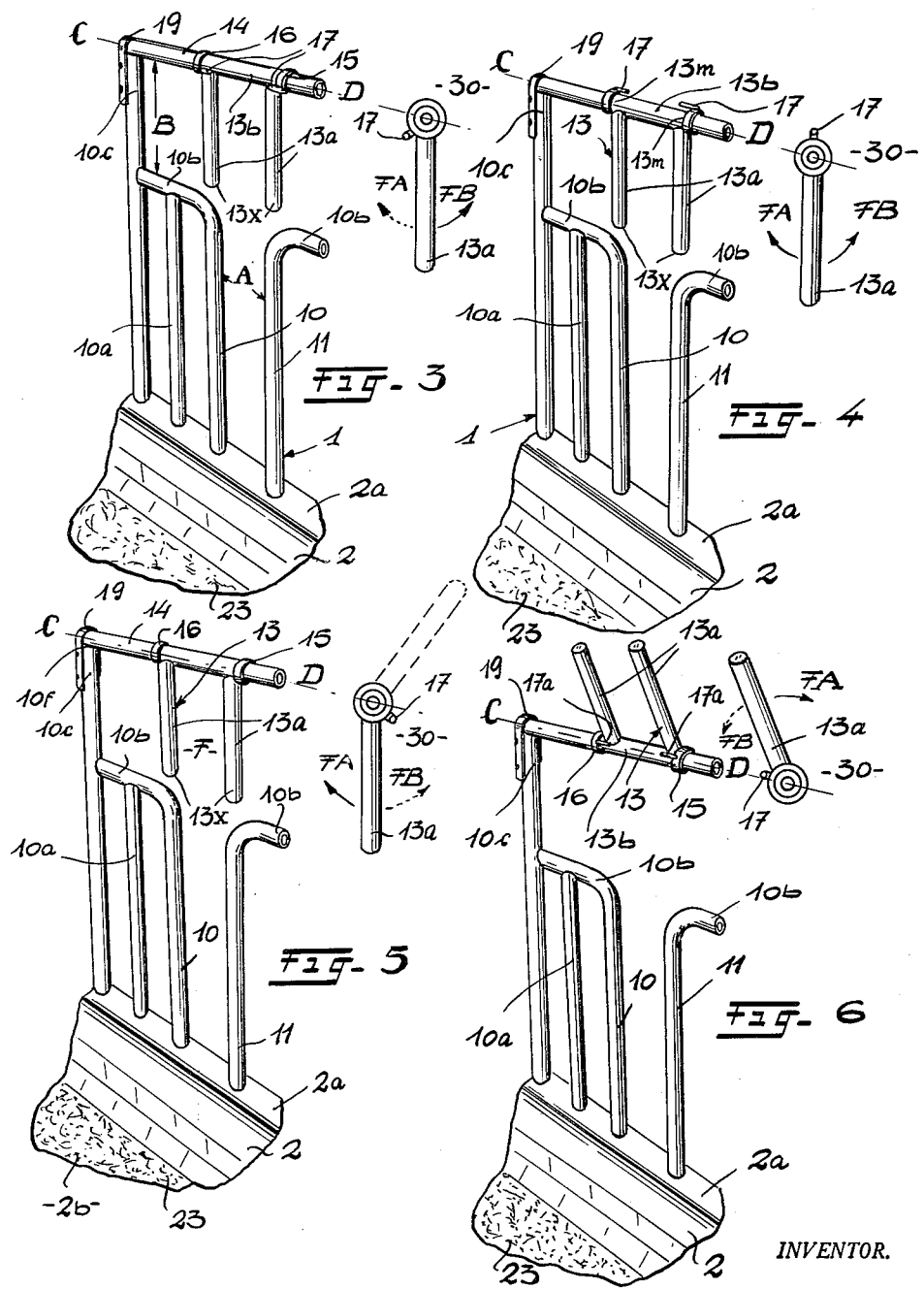

United States Patent Office 3,046,941
Patented July 31, 1962

3,046,941
ANIMAL STANCHION APPLIANCE
Giovanni Battista De Filippi, Viarolo, Parma, Italy
(% Ing. A. Giambrocono, Via Durini 4, Milan, Italy)
Filed Apr. 29, 1960, Ser. No. 25,745
Claims priority, application Italy May 16, 1959
9 Claims. (Cl. 119—148)

This invention has reference to appliances for captivating animals and is concerned, more particularly, with appliances which are primarily intended to be installed along and adjacent to the mangers of cattle and like stalls which are commonly provided in stables and like buildings.

The principal object is to provide an appliance which is adapted automatically to captivate any one or more of a number of animals by the head irrespectively of whether the animals have previously been tethered.

A further object of the invention is to provide an animal captivating appliance which is easy to install and operate.

Another object of the invention is to provide an animal captivating appliance which is economical to manufacture.

Another object of the invention is to provide an animal captivating appliance which is capable of being installed in any stable or like building with a minimum of modifications to the existing structure.

Still another object of the invention is to provide an appliance which is adapted to captivate any one or more of a number of animals without any supervision on the part of a herdsman or like operator so that captivation may be effected without danger to such an operator and without causing him any loss of time.

Yet another object of the invention is to provide an appliance which is adapted to be installed along and adjacent to a manger or feeding trough in a stable or like building and is adapted to captivate any one or more of a number of animals as it commences or they commence to feed from the manger or trough.

A still further object of the invention is to provide an animal captivating appliance which is adapted to captivate any one or more of a number of animals without manual operation of any component parts so that the animals are not alarmed or intimidated and are unable to anticipate their captivation.

Another object of the invention is to provide an animal captivating appliance which is capable of captivating animals whether or not the animals have horns.

A further object of the invention is to provide an animal captivating appliance which, when installed along a manger, minimises the possibility of fodder being wasted by being pushed out of the manger on to stable litter by feeding animals.

A further object of the invention is to provide an appliance which is capable of being conditioned in any one of a number of alternative ways so that, at will, it never prevents animals having access to a feeding manger, may permit access of animals to the manger with or without captivation of any one or more of the animals, or may be rendered inoperative so that animals, particularly shy or nervous animals, feeding from the manger over any given period may become accustomed to the presence of the appliance and will, therefore, not be deterred from feeding from the manger when, at some subsequent date, the said appliance is conditioned for captivating any one or more of the animals.

The above and other objects of the invention will be apparent from the following description when read in conjunction with the accompanying drawings which illustrate a typical but non-restrictive embodiment of the invention.

In the said drawings:

FIGURE 1 is a perspective view of part of an appliance for captivating cows or other animals of comparable sizes.

FIGURE 2 is a sectional elevation, on a larger scale than FIGURE 1, of one end of the appliance.

FIGURE 3 is a perspective view and an elevation of certain components of the appliance, conditioned to prevent an animal inserting its head into the appliance.

FIGURE 4 is a perspective view and an elevation of the components shown in FIGURE 3, but shows the said components conditioned to enable the insertion and removal of an animal's head into and from the appliance.

FIGURE 5 is a perspective view and an elevation of the components shown in FIGURE 3, but shows the said components conditioned to enable the insertion but prevent removal of an animal's head into and from the appliance.

FIGURE 6 is a perspective view and an elevation of the components shown in FIGURE 3, but shows the said components conditioned to enable free and unobstructed insertion and removal of an animal's head into and from the appliance.

The appliance shown in the drawing comprises a frame 1 which is fixed upon, extends along the length of and projects vertically upwards from, the top edge 2a of a wall 2 built upon the floor 2b of a stable or like building for housing cows or other animals of comparable sizes. The said wall is of a depth such that the animals are able to pass their heads over its upper edge 2a and a shallower wall 3 is built on the stable floor parallel to the base wall 2, the space 2c between the two walls forming a manger 23 into which fodder may be charged and then eaten by the animals while standing on the side 30 of the said base wall opposite to the said shallower wall 3.

The frame 1 comprises a number of vertical pillars 10c which are spaced equidistantly apart along the length, and reach to the same distance above the top, of the wall 2. A cylindrical rail 14 which is rotatable about its axis C—D extends horizontally from end to end of the frame, the rail is carried by and upon the upper ends 10f of the said pillars, and is retained in position by straps 19 each of which straddles the rail and is fixed to opposite sides of a corresponding one of the pillars so that, in combination with the head of the pillar, it provides a bearing for the rail.

Between each two adjacent pillars, two sets of railings are fixed upon and project vertically upwards from the top of the wall 2. Each set of railings consists of a vertical boundary post 10 and 11 respectively, of which the upper part is swept over at right angles away from the boundary post of the other set of railings to provide a horizontal bridge 10b. The free end 13x of the bridge is fixed to the adjacent pillar 10c and one or more vertical posts 10a extend between, and are fixed to, the top of the wall 2 and the underside of each bridge 10b. The vertical boundary posts 10, 11 between each two adjacent pillars, are spaced apart by a clearance of which the width A is such that it is just possible for an animal to pass its neck downwardly between the said posts, whereas the bridges 10b are spaced from the rail 14 by a clearance of which the depth B is sufficient to enable the animal to pass its head freely between the bridges and rail.

The rail carries a number of forked units 13, four such units being shown at F, G, H, and I respectively in FIGURE 1. Each unit is located vertically above the clearance between a corresponding two vertical boundary posts 10, 11, and comprises a sleeve 13b which is mounted upon and is rotatable freely around the rail 14. The sleeve is of a length greater than the width A, is located symmetrically of the corresponding interpost clearance so that it reaches equidistantly to the remote sides of the corresponding posts 10, 11, and is provided with a parallel pair of radially projecting arms 13a which, due to the ability of the sleeve to rotate freely about the rail 14, tend to assume a position wherein they extend vertical downwards from the rail. The arms 13a of each pair are spaced apart by the distance A and each sleeve is retained in its symmetrical relationship to the corresponding inter-post clearance by a corresponding pair of collars 15, 16 which encircle and are clamped upon the rail, and which respectively abut the opposite ends 13m of the sleeve to prevent longitudinal movement of the latter upon the rail. Hence, when the arms of any one pair extend vertically downwards from the rail, they are aligned respectively with the corresponding boundary posts 10 and 11, and the clearance between the said arms is in register with the clearance between the said posts.

Each of the collars 15, 16 at the opposite ends of each sleeve 13b, is provided with a stop 17 which projects from its external periphery and parallel to its axis, towards the collar at the other end of the said sleeve. The stops therefore overhang the respective sleeve ends and each is of a length such that as and when the rail 14 and the clamped collars are turned about the axis C—D, the free ends 17a of the stops travel along paths which pass respectively through the arms 13a of the corresponding forked unit.

To enable the rail to be rotated about the said axis and to be secured in any one of four alternative positions, shown in FIGURES 3–6 respectively, spaced at predetermined angular distances apart, a disc-like flange 18 is fixed upon, or is integral with, one end of the rail; the flange is concentric to the rail and has four holes 18a therein; the holes are located at the same distance from the axis C—D and are spaced apart by the said predetermined angular distances so that any one of the said holes is adapted to be engaged by a threaded pin 20 which is screwed into and projects laterally from, a bracket 21 fixed upon the adjacent pillar 10c, so as to lock the rail in the corresponding one of the said four alternative positions.

In the rail position shown in FIGURE 3, the stops 17 for each of the forked units are located below the rail axis and on the side of the arms 13a adjacent the manger 23. Hence, should an animal standing on the side 30 of the appliance attempt to obtain access to the manger by passing its head through the clearance between the bridges 10b and rail 14 and by lowering its neck into and down the clearance between any two posts 10, 11 of the railings, it will be frustrated because the collars prevent displacement of the forked units lengthwise of the rail and the stops prevent the said units swinging to the manger side of the railings in the direction of the arrow FA, through a sufficient distance to enable the animal to pass its head between the arms and the said bridges. This animal-excluding position of the rail enables, for example, a farm labourer or like workman to have free and unhindered access to the manger so that he may clean and restock the manger with fodder with a maximum of ease and in a minimum of time even though animals are housed within the stable on the opposite side of the railings.

By disengaging the pin 20 from the flange 18, the rail may be rotated about its axis C—D in the direction of the arrow FA to the position shown in FIGURE 4 and be locked in this position by engaging the pin with a second of the four holes 18a. In this position of the rail and stops, the forked units are free to swing in either of the two opposite directions indicated by the arrows FA, FB, about the said axis; consequently, any animal, whether tethered or free, standing on the side 30 of the railings may obtain access to the manger 23, by pushing its head against one of the forked units to swing the said unit in the direction of the arrow FA and enable it to pass its head through the clearance between the rail and corresponding inter-post clearance, and then pass its neck down the latter clearance. As the animal lowers its neck down the inter-post clearance, the forked unit returns to the initial position wherein the arms 13a depend vertically downwards from the rail; nevertheless, by raising its head to take its neck from the inter-post clearance into the inter-arm clearance, the animal is able to withdraw its head from the appliance because the forked unit is free to swing in the direction of the arrow FB.

However if, instead of turning the rail and collars from the position shown in FIGURE 3 to the position shown in FIGURE 4, it had been turned to and relocked in the position shown in FIGURE 5 wherein the stops are located below the axis C—D but on the side 30 of the rail, the animal would automatically be held captive in the appliance because, on raising its neck into the inter-arm clearance of the corresponding forked unit, the stops would prevent the unit swinging in the direction of the arrow FB through a sufficient distance to enable the animal to withdraw its head through the clearance between the rail and the inter-post clearance. Whilst the animal is held captive in this manner, it is prevented from interfering with any other animal feeding from the manger: if, as is the primary intention, the contrivance is installed in a cow milking shed, the cows may be held captive whilst being milked thereby obviating the need for manual tethering by a farm labourer or like workman: the workman may release the cows one at a time immediately the milking of each cow has been completed, merely by swinging the appropriate forked unit manually about the rail, in the direction of the arrow FA, to and beyond the dotted line position shown in FIGURE 5 wherein the arms of the unit are inclined from the rail to the side 30 of the appliance and are supported by and above the stops so that the unit may, if necessary, be swung in the direction of the arrow FB as the cow withdraws its head from the clearance between the rail and interpost clearance. Further, by locking the rail and collars in the position shown in FIGURE 5, a cow may be held captive whilst being subjected to veterinary treatment or for any period whilst being subjected to specialised feeding as may be desirable when, for example, the cow is in calf or is giving a poor milk yield.

The fourth alternative position of the rail and collars shown in FIGURE 6 is the inoperative position, the rail being locked against rotary movement with the stops located above the axis C—D and on the manger side of the said rail. Hence, each of the several forked units may be swung manually about the rail in the direction of the arrow FB, to a stop-supported position wherein the arms 13a are inclined upwardly of the rail and towards the manger and, therefore, offer no obstruction to the passage of an animal's head in either direction through the clearance between the rail and inter-post clearance. By enabling the rail to be locked in and for the forked units to be swung to their fourth alternative position, the cows may be trained to become familiar with the appliance. By locking the rail in, and swinging the forked units to, their respective inoperative positions shown in FIGURE 6, cows or other animals, even if some or all of them may be of a shy or nervous character, will not be deterred from feeding from the manger by the presence of the depending arms or the fear of being held captive should they attempt to feed from the manger; then, when once the animals have become accustomed to the presence of the appliance and have been trained to feed from the manger with the installed appliance, they will not be deterred when, subsequently, the rail and collars are locked in any of the three alternative positions shown in FIGURES 3–5.

Although only one specific embodiment of the invention has been described and illustrated in detail, it is to be understood that various modifications may be made without departing from the spirit and scope of the invention.

I claim:

1. An appliance for captivating animals, comprising a horizontal rail, a number of forked units mounted upon and rotatable freely on the said rail, and means for determining both the direction and the angle in and through which each of the said units may be rotated on the rail.

2. An appliance for captivating animals, comprising a horizontal cylindrical rail, a number of forked units each comprising a sleeve which is disposed around and is rotatable freely on the said rail and is provided with a pair of parallel radial arms, and co-operating means on said rail and each of said sleeves for determining both the direction and the angle in and through which the corresponding one of said units may be rotated on the rail.

3. An appliance for captivaing animals, comprising a structure having vertical slots opening to its upper edge, a horizontal rail disposed above and spaced from said upper edge, a number of forked units mounted upon and rotatable freely on the said rail each of said units being located vertically above a corresponding one of said slots, and means for determining both the direction and the angle in and through which each of said units may be rotated on the rail.

4. An appliance for captivating animals, comprising a wall, vertical pillars projecting upwardly from the upper edge of said wall, two sets of vertical railings which are of a height less than the pillar height and of which the adjacent edges are spaced apart, projecting vertically upwards from said wall edge between each two adjacent pillars, a horizontal rail mounted upon the upper ends of said pillars, a corresponding forked unit of which the arms are spaced apart by the same distance as said adjacent railing edges, mounted upon and rotatable freely on said rail vertically above the clearance between each of said two sets of railings, and means for determining both the direction and the angle in and through which each of said units may be rotated on said rail.

5. An appliance for captivating animals, comprising a horizontal rail, a number for forked units mounted upon and rotatable freely on said rail, and stops fixed upon said rail and each co-operating with a corresponding one of said forked units to determine both the direction and the angle in and through which the unit may be rotated on the rail.

6. An appliance for capitivating animals, comprising a horizontal rail, forked units each comprising a sleeve and a pair of parallel arms projecting radially from said sleeve, mounted by said sleeves upon and rotatable freely on said rail, each of said sleeves being located between a corresponding pair of collars disposed around and fixed to said rail, at least one of said collars being provided with a stop which projects lengthwise of the rail into the path of travel of the adjacent arm of the corresponding forked unit when the sleeve of the unit is rotated on the rail.

7. An appliance for captivating animals, comprising a number of spaced vertical pillars, a horizontal rail mounted upon the upper ends of said pillars for rotation about its axis, a corresponding forked unit mounted upon and rotatable freely on said rail between each adjacent two of said pillars, co-operating means on said rail and each of said units for determining both the direction and the angle in and through which said units may be rotated on the rail, and co-operating means on at least one of said uprights and the rail for locking the rail in any one of a number of alternative angularly spaced positions upon the pillars.

8. An appliance for captivating animals, comprising a number of spaced vertical pillars, a horizontal rail mounted upon the upper ends of said pillars for rotation abouts its axis, as least one disc-like flange provided on and concentrically of said rail and having an annular system of holes therein, a pin carried upon one of said pillars adjacent to said flange, said pin being longitudinally adjustable relatively to said adjacent pillar for engagement in and disengagement from any one of said holes, a corresponding forked unit mounted upon and rotatable on said rail between each two adjacent pillars and co-operating means on said rail and units for determining both the direction and the angle in and through which each of said units may be rotated on the rail.

9. An appliance for captivating animals, comprising a horizontal rail which is rotatable about its axis, a number of forked units mounted upon and rotatable freely on the said rail, co-operating means on the rail and each unit to determine both the direction and the angle in and through which each unit may be rotated on the rail, vertical pillars supporting the rail, and co-operating means on the rail and at least one of the pillars for locking the rail to the pillars in any one of a number of alternative angularly spaced positions.

References Cited in the file of this patent

UNITED STATES PATENTS

| | | |
|---|---|---|
| 363,902 | McCartney | May 31, 1887 |
| 1,549,245 | Currie | Aug. 11, 1925 |